United States Patent [19]

Marchetti et al.

[11] Patent Number: 4,718,072
[45] Date of Patent: Jan. 5, 1988

[54] CORONA DISCHARGE PREIONIZER FOR GAS LASER

[75] Inventors: Renato Marchetti; Eugenio Penco; Gianemilio Salvetti, all of Rome, Italy

[73] Assignees: Enea - Comitato Nazionale per la Ricerca e Lo Sviluppo Della Energia Nucleare e Delle Energie Alternative; Selenia - Industrie Ellettroniche Associate S.p.A., both of Rome, Italy

[21] Appl. No.: 51,161

[22] Filed: May 15, 1987

Related U.S. Application Data

[63] Continuation of Ser. No. 686,388, Dec. 26, 1984.

[30] Foreign Application Priority Data

Dec. 29, 1983 [IT] Italy .................... 49600 A/83

[51] Int. Cl.$^4$ ............................................. H01S 3/097
[52] U.S. Cl. .................................... 372/86; 372/55
[58] Field of Search .............. 372/86, 87, 55; 378/88, 378/81, 83

[56] References Cited

U.S. PATENT DOCUMENTS

| | | | |
|---|---|---|---|
| 4,380,079 | 4/1983 | Cohn et al. | 372/87 |
| 4,555,787 | 11/1985 | Cohn et al. | 372/86 |
| 4,556,981 | 12/1985 | Cirkel et al. | 372/86 |

FOREIGN PATENT DOCUMENTS

| | | | |
|---|---|---|---|
| 1159937 | 1/1984 | Canada | 372/87 |
| 0048407 | 3/1982 | European Pat. Off. | 372/87 |

OTHER PUBLICATIONS

Cohn, "CO$_2$ Laser Excited by Preionizer Transverse Discharge through a Dielectric", Appl. Phys. Lett. 37(9), Nov. 1, 1980, p. 771.

Primary Examiner—Léon Scott, Jr.
Attorney, Agent, or Firm—Stevens, Davis, Miller & Mosher

[57] ABSTRACT

A gas operated laser is disclosed which comprises two main electrodes facing each other and connected with a single feeding capacitor both for the preionization and for the main laser discharge, wherein the gas preionization in the laser vessel is obtained by a corona discharge generator comprising a dielectric tube along the outside of which a conducting wire is stretched to contact the outer surface of the tube which conductor connects with one of the discharge electrodes while a thin conducting rod inserted in said tube connects with the other discharge electrode. As a first alternative an edge of a conducting material shape is used as a substitute for said conducting wire. As a second alternative the side sharp edge of one of the main electrodes is used in lieu of said conducting wire.

1 Claim, 7 Drawing Figures

CORONA DISCHARGE PREIONIZER FOR GAS LASER

This application is a continuation of application Ser. No. 686,388, filed Dec. 26, 1984.

The present invention relates to an apparatus and method for producing the gas preionization in a laser vessel.

According to the most usual techniques the gas preionization in a laser vessel is obtained through a series of arc discharges near one or both the main laser electrodes.

Such a technique does not allow a proper operation of a sealed-off laser in as much as in the case of sealed-off $CO_2$ lasers, the preionizing arc discharges, having a high current density, are liable to cause $CO_2$ dissociation whereby the laser life in the sealed-off conditions is shortened due to the presence of oxygen produced by such dissociation. Furthermore a homogeneous longitudinal distribution of the electron density is not achieved by arc discharge preionization.

According to this invention the above series of arc discharges is replaced by corona discharges. The radiation produced by corona discharges is a VUV radiation within the range from 100 to 400 nm corresponding to the range from 12.4 to 3.5 eV and therefore it provides an effective preionization for gas lasers ($CO_2$, CO, HF, DF, $N_2$ etc.) in either the pulse or the continuous operation.

Both the above drawbacks are overcome by the system of this invention in as much as the corona dicharge is a so called "cold" discharge and then slightly dissociating and in as much as by the arrangement herein proposed the longitudinal distribution of the electron density (Ne) is wholly uniform.

This invention will be better understood from the following description and the attached drawings which illustrate by way of example a preferred embodiment thereof. In the drawings.

Figure 1:
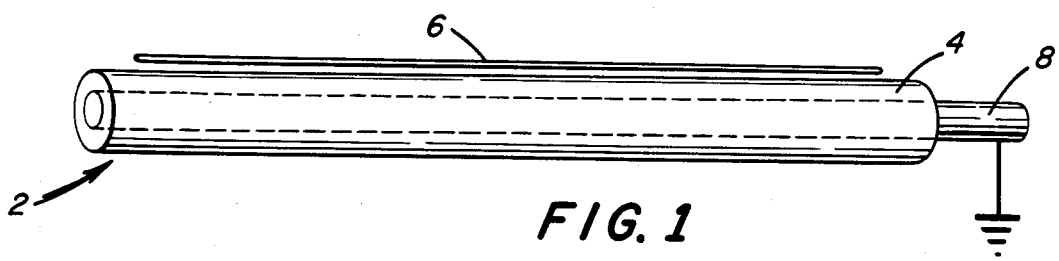
FIG. 1 shows a perspective view of a preionizing element by corona discharge.
Figure 3:
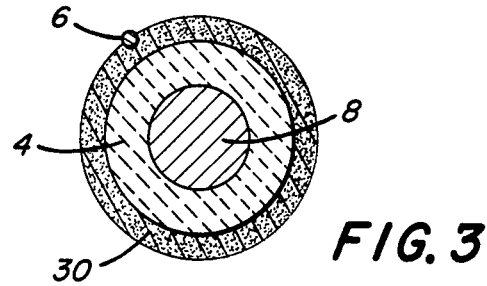
Figure 2A:
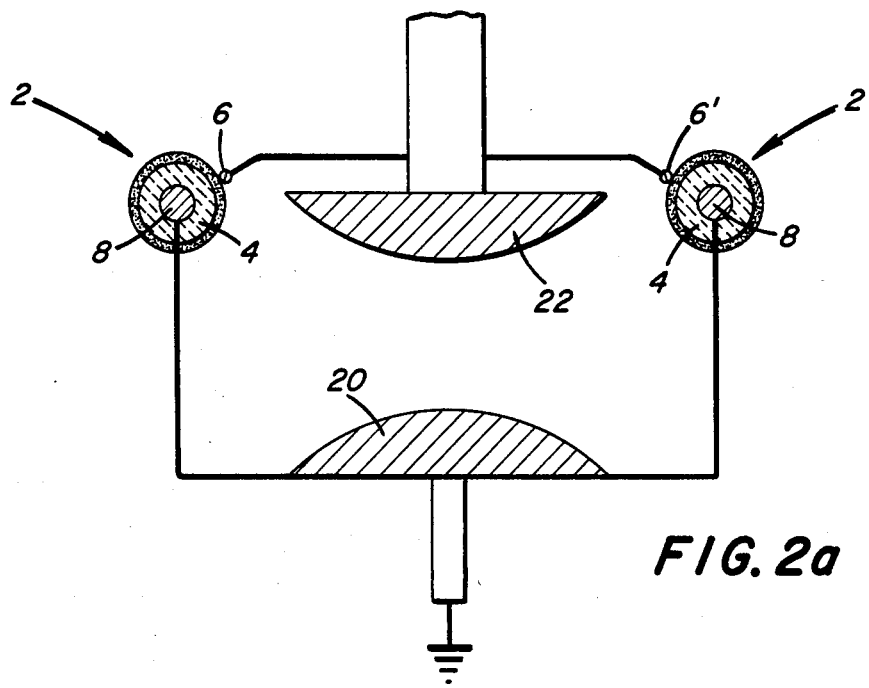
FIG. 2a shows an enlarged detail of FIG. 2.
Figure 2:
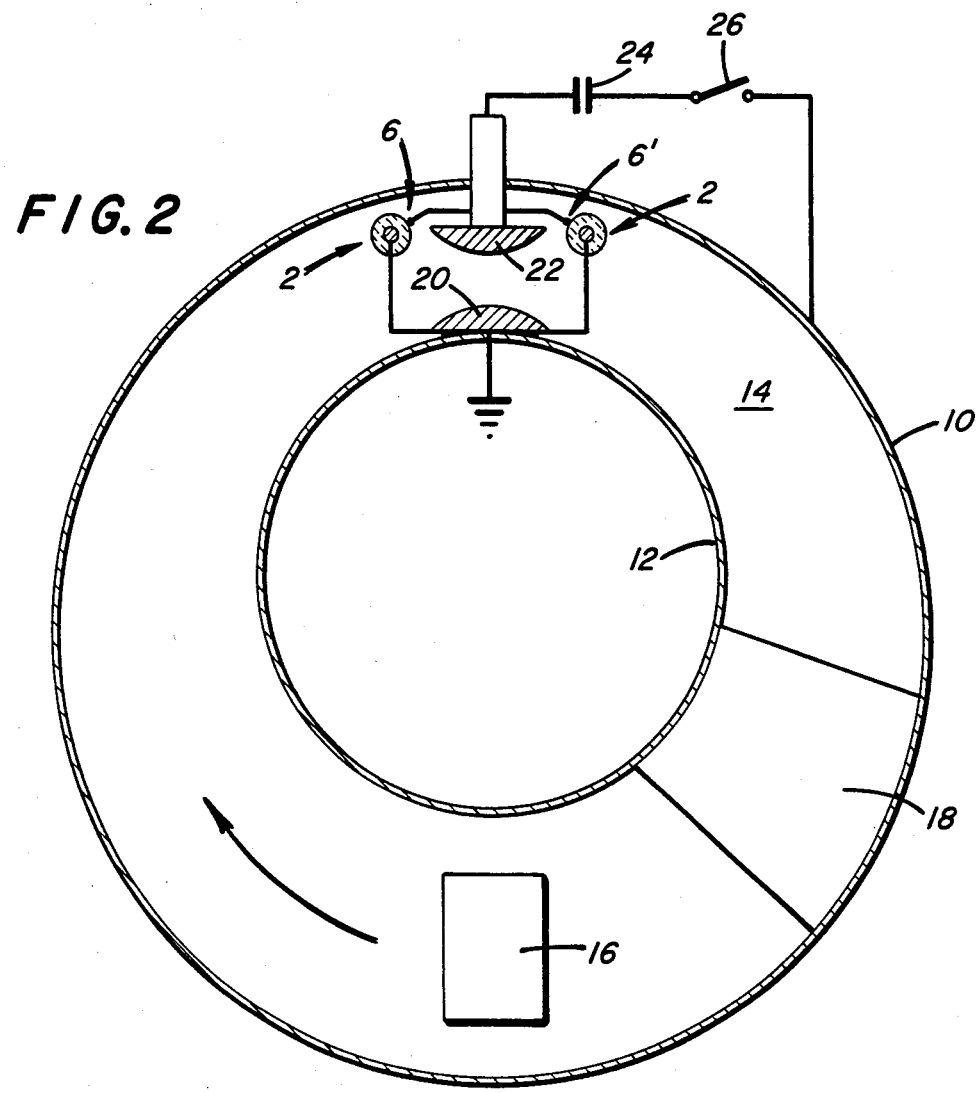
FIG. 2 shows a laser apparatus equipped with corona discharge preionizers according to this invention along with the related electric circuit.

With reference to the figures and specifically to FIGS. 1 and 2 the preionizer 2 of this invention comprises a tube 4 of dielectric material which may be a glass, for instance pyrex or a ceramic material, for instance alumina or even a plastic material such as teflon (trade name for a polimerized tetrafluoroethylene product) along the outer surface of which a small diameter wire 6 as shown in FIG. 3 or a conducting material shape 7 extends which shape has a sharp longitudinal edge facing the surface of tube 4. It is to be noted that, as shown in FIG. 5 the function performed by the preionizer outer electrode can also be performed by a sharpened edge of one of the main laser electrodes 20,22 provided that such edge is arranged to contact the outer surface of the dielectric tube 4.

Figure 4:
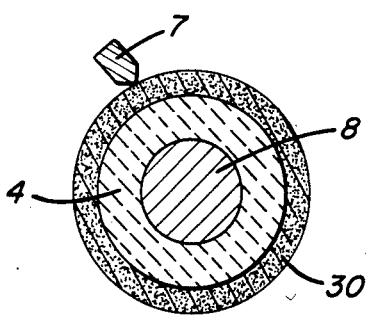
FIGS. 3, 4, 5 show three different configurations of the preionizer according to the invention.
Figure 5:
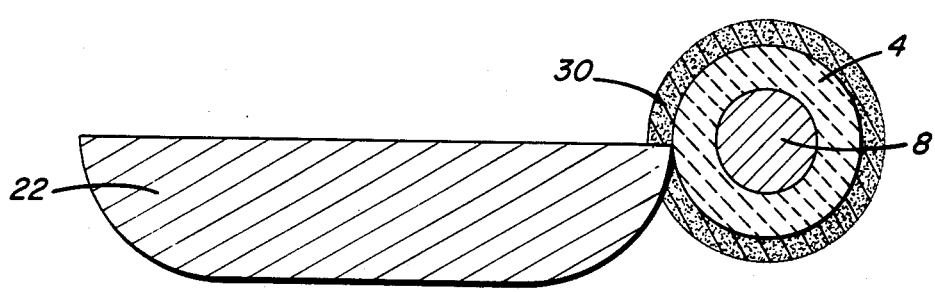

In FIGS. 3, 4, 5 a cross-hatching 30 is used to represent the corona discharge.

A conducting rod 8 is inserted into tube 4 which rod functions as a mechanical support and as an electrode of the corona discharge system.

An arrangement of the preionizing element 2 in a laser apparatus is shown in FIG. 2 which represents a cross section of a sealed-off laser equipped with a gas recycling and refrigerating system.

It comprises an outer cylindrical shell 10 and an inner cylindrical shell 12 the axes of which are parallel but not coincident, an eccentric sealed space being thus defined between them in the wider section of which a turbofan 16, and a cooling exchanger 18 are housed along with other possible equipment adapted for restoring the laser gaseous mixture which underwent a laser discharge to the starting temperature and chemical composition as specified for a proper laser operation.

Within the narrower section of space 14 the laser vessel with the pair of main discharge electrodes 20,22 facing each other is received. Electrode 22 connects with one side of the discharge capacitor 24 while electrode 20 and the frame of the apparatus are grounded, the other side of the same capacitor being connectable to ground through switch 26. Capacitor 24 is fed by a source (not shown) of uninterrupted unidirectional current, switch 26 being controlled by a repetition generator not shown.

Ionizers 2 are located each at one side of electrode 22 with which the outer wires 6 of each ionizer connect while the respective inner rod 8 is grounded.

The effectiveness of this invention has been proven through factual tests carried out on an existing laser apparatus formerly operated by arc preionizer.

The following are the advantages achieved by such laser.

Figure 6:
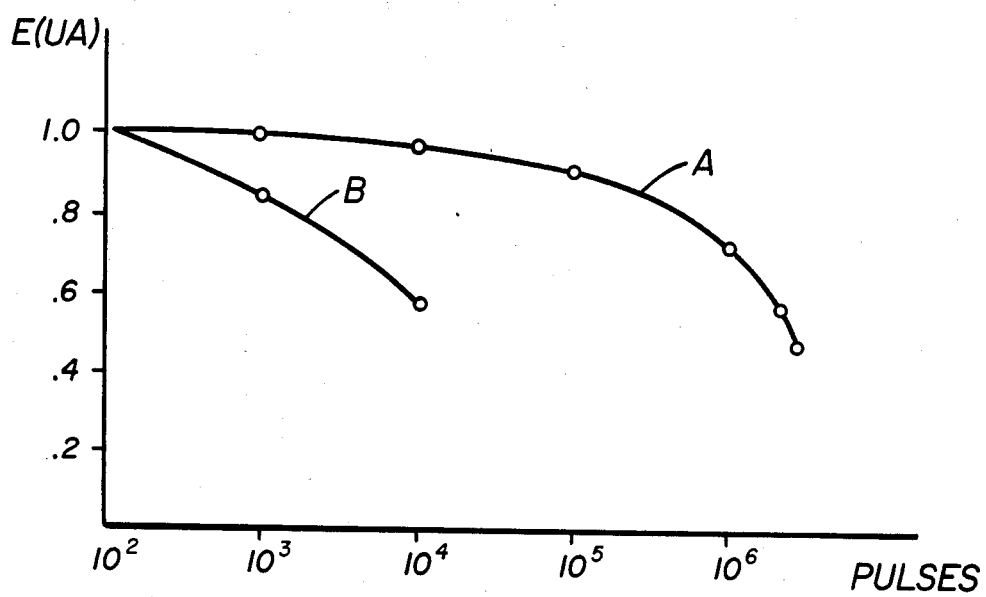
FIG. 6 shows a diagram of the output energy.

The graph of FIG. 6 shows a comparison of the life of a corona discharge preionized laser according to this invention compared with an arc preionized laser, both lasers being operated with a $CO_2$ gaseous mixture and in sealed-off conditions.

As it appears from said graph the arc discharge preionized laser (line B) can operate through $10^4$ pulses while the life of the corona discharge preionized laser (line A) can attain $2.5 \times 10^6$ pulses. The difference between the two lives is due to the $CO_2$ dissociation caused by the arc discharges.

From the tests as above another advantage became apparent that is the low energy consumption in the preionizing work which resulted to be about 5% of the pumping energy against about 50% in the case of arc discharge preionization.

It is further to be noted that owing to the small dimensions of the preionizers according to this invention wherein the preionizer diameters are less than 0.6 cm the laser so equipped can operate at very high repetition frequency in as much as the transverse flow of the laser gaseous mixture is not obstructed by the preionizers the speed of such flow being essential for a good operation at high repetition rates. Finally it is to be stressed that in the laser of this invention the photon emission is confined to the band spectrum which is of interest for the preionization in as much as it has been experimentally verified that the photons emitted by a corona discharge are essentially in the UV band.

We claim:

1. A sealed-off gas laser for long life high repetition operation comprising a pair of main discharge electrodes and a pair of high repetition corona discharge generators; each of said high repetition corona discharge generators comprising a dielectric material tube, a conducting rod received into said tube, which rod extends for the whole length of the tube characterized by the fact that said dielectric material tube is in contact with the edge of one of the two main electrodes, said conducting rod connecting the other main discharge electrode.

* * * * *